United States Patent
Kang et al.

(10) Patent No.: US 9,412,090 B2
(45) Date of Patent: Aug. 9, 2016

(54) SYSTEM, MOBILE COMMUNICATION TERMINAL AND METHOD FOR PROVIDING INFORMATION

(75) Inventors: Moon-Soon Kang, Seongnam-si (KR); Jang-Hyuk Park, Seoul (KR)

(73) Assignee: KT Corporation, Seongnam (KR)

(*) Notice: Subject to any disclaimer, the term of this patent is extended or adjusted under 35 U.S.C. 154(b) by 131 days.

(21) Appl. No.: 13/589,828

(22) Filed: Aug. 20, 2012

(65) Prior Publication Data

US 2013/0045686 A1      Feb. 21, 2013

(30) Foreign Application Priority Data

Aug. 18, 2011  (KR) .................. 10-2011-0082446

(51) Int. Cl.
*G06Q 10/10*    (2012.01)
*G06Q 30/02*    (2012.01)

(52) U.S. Cl.
CPC ............ *G06Q 10/10* (2013.01); *G06Q 30/0251* (2013.01)

(58) Field of Classification Search
USPC ........... 455/41.2, 41.1, 456.1–456.3, 412.1, 455/414.2, 414.3, 415
See application file for complete search history.

(56) References Cited

U.S. PATENT DOCUMENTS

| | | | |
|---|---|---|---|
| 7,522,882 B2* | 4/2009 | Shibuya | 455/41.2 |
| 2006/0099911 A1* | 5/2006 | Shibuya | 455/41.2 |
| 2008/0113655 A1* | 5/2008 | Angelhag | 455/414.2 |
| 2009/0058647 A1* | 3/2009 | Dennard et al. | 340/572.1 |
| 2011/0162066 A1* | 6/2011 | Kim et al. | 726/18 |
| 2012/0028577 A1* | 2/2012 | Rodriguez et al. | 455/41.1 |
| 2012/0115513 A1* | 5/2012 | Han | 455/456.3 |

FOREIGN PATENT DOCUMENTS

| | | |
|---|---|---|
| JP | 02-181190 A | 7/1990 |
| KR | 10-2006-0097809 A | 9/2006 |
| KR | 10-0792340 B1 | 12/2007 |
| KR | 10-2010-0077687 A | 7/2010 |
| KR | 10-2011-0041328 A | 4/2011 |

OTHER PUBLICATIONS

Office Action issued in corresponding Korean Patent Application No. 10-2011-0082446 on Apr. 30, 2014.
Office Action issued by the Korean Patent Office in Korean Patent Application No. 10-2011-0082446 dated Feb. 13, 2014.
Korean Office Action; Application No. 10-2011-0082446; Jul. 14, 2014.

* cited by examiner

*Primary Examiner* — Junpeng Chen
(74) *Attorney, Agent, or Firm* — Sughrue Mion, PLLC

(57) ABSTRACT

A system, a mobile communication terminal, and a method for providing information. The system for providing information includes: a tag configured to store tag information; a mobile communication terminal configured to obtain the tag information using short-range communication and to calculate position information of the mobile communication terminal when the tag information is obtained; and an information providing server configured to receive the tag information and the position information from the mobile communication terminal, extract service address information which provides information for connecting to a service identified by the tag information and based on the position information, and provide the extracted service address information to the mobile communication terminal. The mobile communication terminal is connected to the service based on the service address information.

30 Claims, 6 Drawing Sheets

SYSTEM, MOBILE COMMUNICATION TERMINAL AND METHOD FOR PROVIDING INFORMATION

CROSS-REFERENCE TO RELATED APPLICATIONS

This application claims the benefit of priority from Korean Patent Application No. 10-2011-0082446, filed with the Korean Intellectual Property Office on Aug. 18, 2011, the disclosure of which is incorporated herein by reference in its entirety.

BACKGROUND

1. Technical Field

Exemplary embodiments broadly relate to a short-range communication, and more specifically, to a system, a method and a mobile communication terminal for providing information using the short-range communication.

2. Background Art

In a related art, a system and a method for recognizing external information using a short-range reader attached to a mobile communication terminal is provided as described in Korean Patent Number 792340 B1 (Date of Patent: Dec. 31, 2007). This related art describes obtaining relevant information by selectively and automatically storing and running advertisement information and utilization information about a certain object using a short-range tag and a short-range reader.

SUMMARY

A mobile communication terminal with a short-range communication function that provides information according to a tagged position of the mobile communication terminal is provided.

Moreover, a mobile communication terminal that provides information according to the position of the mobile communication terminal when the mobile communication terminal recognizes code information such as a QR code is also provided.

According to one aspect of an exemplary embodiment, there is provided a system for providing information.

According to an aspect of an exemplary embodiment, the system for providing information includes: a tag configured to store tag information; a mobile communication terminal configured to obtain the tag information using short-range communication and to calculate position information of the mobile communication terminal when the tag information is obtained; and an information providing server configured to receive the tag information and the position information from the mobile communication terminal, extract service address information which provides information for connecting to a service identified by the tag information and based on the position information, and provide the extracted service address information to the mobile communication terminal. The mobile communication terminal connects to the service based on the service address information.

According to another aspect of exemplary embodiment, there is provided a mobile communication terminal.

According to an aspect of an exemplary embodiment, the mobile communication terminal includes: a short-range communication unit configured to obtain tag information from a tag; a sensor configured to calculate position information of the mobile communication terminal when the tag information is obtained; and a controller configured to obtain service address information from a server providing the service address information which provides information for connecting to a service identified by the tag information and based on the position information and to control connecting to the service based on the service address information.

According to yet another aspect of an exemplary embodiment, there is provided a method for providing information using short-range communication.

According to one aspect of an exemplary embodiment, the method for providing information using short-range communication includes: obtaining, by the mobile communication terminal, tag information from a tag using the short-range communication; calculating, by the mobile communication terminal, its position information; transmitting, by the mobile communication terminal, the tag information and the position information to an information providing server; extracting, by the information providing server, service address information which provides information for connecting to a service identified by the tag information and based on the position information and transmitting, by the information providing server, the extracted service address information to the mobile communication terminal; and connecting, by the mobile communication terminal, to the service based on the service address information.

According to yet another aspect of an exemplary embodiment, there is provided a method for providing information.

According to an aspect of an exemplary embodiment, the method for providing information includes: obtaining, by a mobile communication terminal, code information; calculating, by the mobile communication terminal, its position information; and transmitting, by the mobile communication terminal, the code information and the position information to an information providing server; extracting, by the information providing server, service address information which provides information for connecting to a service identified by the code information and based on the position information and transmitting, by the information providing server, the extracted service address information to the mobile communication terminal; and connecting, by the mobile communication terminal, to the service based on the service address information.

DETAILED DESCRIPTION OF EXEMPLARY EMBODIMENTS

Figure 1:
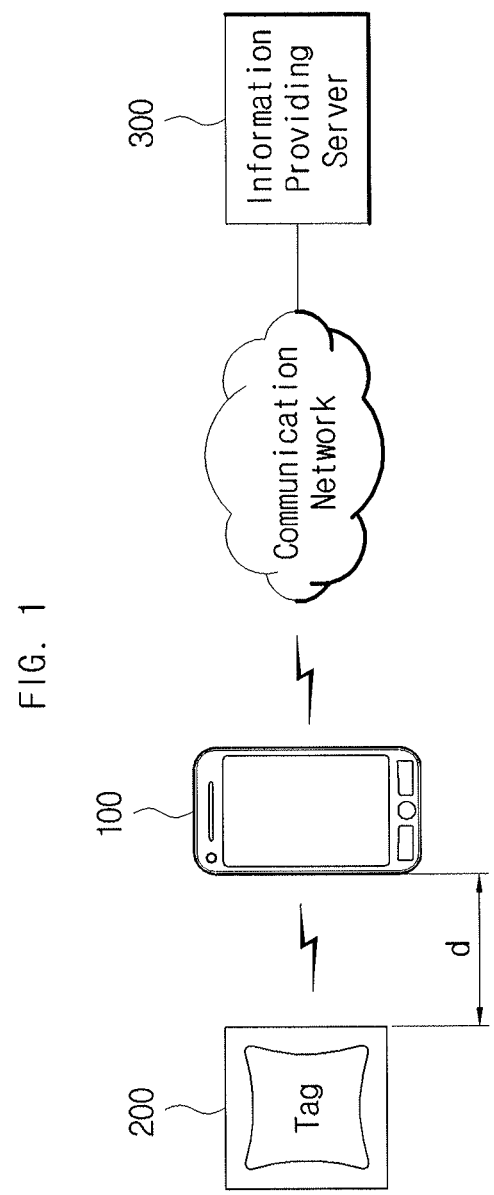
FIG. 1 is a view illustrating a configuration of a system for providing information using short-range communication according to an exemplary embodiment.

Since there can be a variety of modifications, changes, and embodiments, certain exemplary embodiments will be illustrated and described with reference to the accompanying drawings. This, however, is by no means restricts an inventive concept to certain embodiments, and shall be construed as including all modifications, changes, equivalents, and substitutes covered by the ideas and scope of an inventive concept as will be apparent to one of ordinary skill in the art. The following detailed description is provided to assist the reader in gaining a comprehensive understanding of the methods, apparatuses, and/or systems described herein.

Throughout the description, when describing a certain technology is determined to evade the point of an exemplary embodiment, the pertinent detailed description will be omitted. Numerals and terms (e.g., first, second, etc.) used in the description of various exemplary elements are only for distinguishing one element from another element.

When one element is described as being "connected" or having "access" to another element, it shall be construed as being connected or having access to the other element directly but also as possibly having another element in between, unless disclosed otherwise.

Hereinafter, exemplary embodiments will be described in detail with reference to the accompanying drawings. Identical or analogous elements will be given the same reference numerals, regardless of the figure number, and any redundant description of the identical or corresponding elements will not be repeated.

FIG. 1 is a view illustrating a configuration of a system for providing information using short-range communication according to an exemplary embodiment.

Referring to FIG. 1, the system for providing information includes a mobile communication terminal 100, a tag 200, and an information providing server 300.

The tag 200 is attached to an object, such as an advertisement paper, and is installed in various locations, such as a department store, a subway, a bus, etc. The tag 200 transmits tag information to the mobile communication terminal 100 when the mobile communication terminal 100, which has a reader, approaches the tag 200 within a communicable distance (d). Here, the tag information can include connection information for connecting the mobile communication terminal 100 to the information providing server 300. For example, the connection information can be address information, such as an URL (Uniform Resource Locater), of the information providing server 300.

Moreover, the tag information can include representative information for the information to be provided to the user possessing the mobile communication terminal 100. For example, if the information to be provided to the user is information about a particular movie, the representative information can be a short text, such as the title of the movie or a short synopsis.

The mobile communication terminal 100 is a terminal that has a short-range communication function to obtain the tag information from the tag 200 and carry out communication using a mobile communication network or the wireless Internet. For example, the mobile communication terminal 100 can be an NFC (Near Field Communication) terminal.

The short-range communication can include near field communication (NFC) or any of equivalently-functioning Bluetooth communication, RFID (Radio Frequency Identification) and infrared communication.

The NFC is expanded from the ISO/IEC 14443 proximity-card standard (contactless card or RFID) and can support a smartcard and a reader at the same time.

Moreover, since the NFC is expanded from the ISO/IEEE 14443 standard, the NFC can communicate with a conventional ISO/IEEE 14443 reader or a smartcard as well as an NFC device. The NFC is basically developed for use in mobile communication terminals.

Currently, the NFC is mainly used in the mobile communication terminals and can be operated in three modes of a card emulation mode, a read/write mode, and an inter-terminal (P2P) communication mode.

In the card emulation mode, the NFC device operates like a RFID card such as the ones known in the art. Accordingly, a mobile terminal, instead of the RFID card, may approach an RFID reader. Currently, the specifications of the contactless smartcard have the frequency of 13.56 MHz, the communication distance of 10 cm or less and the communication speed of 106 kbs or higher. The contactless smartcard can be applied for payment or in the fare card industry. If the communication distance for the NFC device can be increased, applications of these devices may also be increased. For example, an NFC device that is configured to be detected from a further distance can be applied to a check-out system in a library, a theft-protection system, etc.

The read/write mode is a mode in which the NFC device works as a card reader. The NFC device can read information of another NFC device or a smart card.

The inter-terminal communication mode is a mode in which two NFC devices are engaged in a P2P (peer-to-peer) communication with each other. In the inter-terminal communication mode, a maximum data communication rate between the NFC devices is 424 kbps. Picture data can be transmitted by moving the mobile communication terminal towards a printer or can be displayed by moving the mobile communication terminal towards a display device.

Data can be transmitted regardless of its format, such as text, image, voice, etc., in the inter-terminal communication mode. Moreover, in the inter-terminal communication mode, data communication of maximum 424 kbps can be made between the NFC devices that are within 10 cm from each other. Furthermore, inter-terminal communication is made in the P2P communication method, unlike a server-client method.

The mobile communication terminal 100 computes position information when the tag information is obtained from the tag 200, and transmits the computed position information together with the tag information to the information providing server 300. Accordingly, the mobile communication terminal 100 can be provided with connection information corresponding to the position information and the tag information from the information providing server 300 and can access the pertinent server, using the provided connection information.

For example, the position information can be a tilt angle of the mobile communication terminal 100 which is approaching the tag 200. In the following exemplary description, it will be assumed that the position information is a tilt angle of the mobile communication terminal 100 with respect to the tag 200.

In the case that the mobile communication terminal 100 approaches the tag 200 and carries out communication with the tag 200, the mobile communication terminal 100 can measure an angle by which the mobile communication terminal 100 is tilted with respect to the tag 200 and compute the measured angle as the approaching angle. Here, the mobile communication terminal 100 can use a sensor or a camera installed therein to measure the tilt angle of the mobile communication terminal 100. The tag 200 can have a reference indicator or angle graduations for use as a reference for measuring the angle.

Moreover, the position information can be generated by measuring the approaching angle of the mobile communication terminal 100 in three-dimensions. For example, the mobile communication terminal 100 can generate the position information by measuring and combining a tilted angle of the mobile communication terminal 100 from the tag 200 and a tilted angle of the mobile communication terminal 100 from the ground.

Exemplary configuration of the mobile communication terminal 100 will be described in greater detail below with reference to FIGS. 2 to 5.

The information providing server 300 provides information based on the position information and the tag information received from the mobile communication terminal 100 to the mobile communication terminal 100. For example, the information providing server 300 can provide the connection information for providing a service according to the representative information and the position information. For this, the information providing server 300 can map and store the connection information corresponding to the representative information and the position information.

For example, if the representative information is information for a particular movie, the connection information according to the position information can be service address information of webpages for purchasing a movie ticket, previewing a movie, posting a message, etc. For example, the service address information can be an URL of a webpage for purchasing a movie ticket if the position information indicates a first position, an URL of a webpage for previewing a movie if the position information indicates a second position, and an URL of a webpage for posting a message if the position information indicates a third position.

In another exemplary embodiment, the information providing server 300 can map and store the connection information according to the position information or time information. For example, the mobile communication terminal 100 can transmit the position information or time information when the tag information is obtained to the information providing server 300, which can then extract and send the connection information based on the position information or the time information to the mobile communication terminal 100.

In yet another exemplary embodiment, the system for providing service using short-range communication can utilize a code, such as a QR code, instead of the above-described tag 200. Specifically, the mobile communication terminal 100 can compute the position information when the code is recognized, and can transmit the position information together with the code recognition information to the information providing server 300. Here, like the tag information, the code recognition information can include the representative information and the connection information for the information providing server 300.

Figure 2:
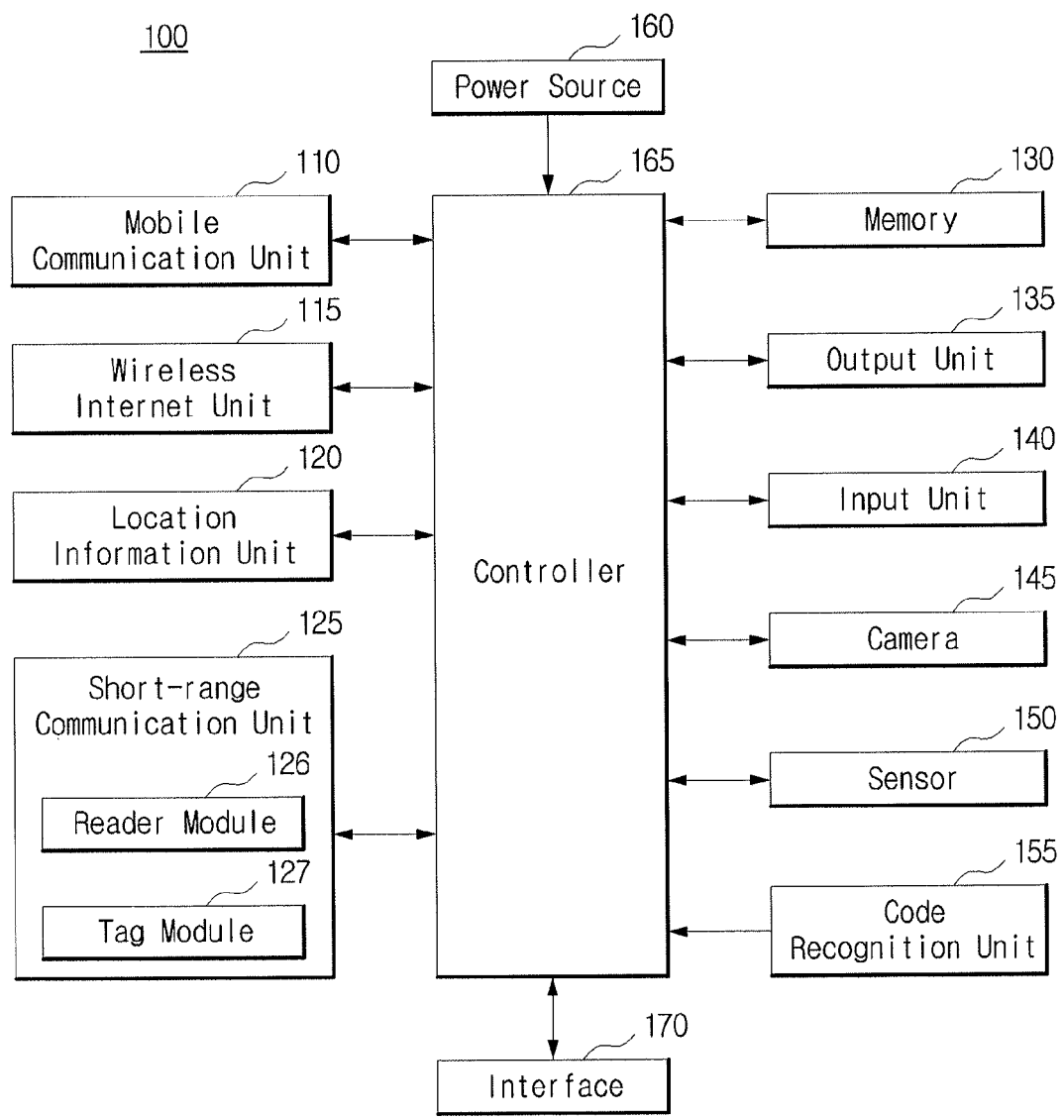
FIG. 2 is a block diagram illustrating a configuration of a mobile communication terminal according to an exemplary embodiment.

FIG. 2 is a block diagram illustrating a configuration of a mobile communication terminal according to an exemplary embodiment.

Referring to FIG. 2, the mobile communication terminal 100 includes a mobile communication unit 110, a wireless internet unit 115, a location information unit 120, a short-range communication unit 125, a memory 130, an output unit 135, an input unit 140, a camera 145, a sensor 150, a code recognition unit 155, a power source 160, a controller 165, and an interface 170.

The mobile communication unit 110 carries out mobile communication between the mobile communication terminal 100 and a mobile communication system. Specifically, the mobile communication unit 110 transmits and receives wireless signals with at least one of a base station, an external terminal, and a server on the mobile communication network. The wireless signals can include various types of data according to transmitting and receiving voice call signals, video call signals, text, or multimedia message.

The wireless internet unit 115 carries out a function of accessing the wireless Internet. The wireless internet unit 115 can be installed internally or externally on the mobile communication terminal 100. Utilized for the wireless internet technology can be WLAN (Wireless LAN, Wi-Fi), Wibro (Wireless broadband), Wimax (World Interoperability for Microwave Access) and HSDPA (High Speed Downlink Packet Access).

The location information unit 120 carries out a function of checking or obtaining a location of the mobile communication terminal 100. A typical example of the location information unit 120 is a GPS (Global Positioning System) module. For example, the location information unit 120 can compute three-dimensional location information based on latitude, longitude, and altitude of a location (object) at a particular time by computing distance information between the location and three or more satellites and information about the particular time when the distance information is computed and then applying trigonometry to the computed distance information.

Moreover, the location information unit 120 can compute the location and time information by using satellites e.g., three satellites and correct an error of the computed location and time information by using another satellite. The location information unit 120 can also compute speed information by continuously computing current locations in real time.

The short-range communication unit 125 can set a communication link with a short-range communication unit installed in another terminal. Here, the distance in which the communication link can be set up is within 10 cm, in the case of NFC.

The short-range communication unit 125 includes a reader module 126 and a tag module 127.

The reader module 126 can read tag information of a tag module installed in another terminal, using the configured communication link.

The tag module 127, which can include an antenna and an integrated circuit, can write the tag information in the integrated circuit and transmit the tag information to the reader module through the antenna. The tag module and the reader module can transmit and receive the tag information to and from each other using electric waves.

The memory 130 can store a program for operation of the controller 165 and can also store input/output data (e.g., phone book, message, still image, video, etc.).

The memory 130 can also store various patterns of vibrations and sounds that are output when a touch screen is touched.

Moreover, the memory 130 can include at least one storage medium of a flash memory type, a hard disk type, a multimedia card micro type, a card type (e.g., SD or XD), Random Access Memory (RAM), SRAM (Static Random Access Memory), Read-Only Memory (ROM), EEPROM (Electrically Erasable Programmable Read-Only Memory), PROM (Programmable Read-Only Memory), a magnetic memory, a magnetic disk and an optical disk.

The output unit 135 generates an acoustic, visual and/or haptic output and can include a display module which displays the output on a screen of a device, an acoustic output module which provides an audio output to the user and/or a haptic module which provides a haptic effect to the user.

Specifically, the display module outputs and displays information processed by the mobile communication terminal 100. For example, the display module displays a UI (User Interface) or a GUI (Graphic User Interface) related to a telephone call, if the mobile communication terminal 100 is in a telephone call mode. If the mobile communication terminal 100 is in a video call mode or a camera mode, the display module can display a photographed and/or received image or the UI or GUI for the same.

Moreover, the display module can be realized as a liquid crystal display, a thin film transistor-liquid crystal display, an organic light-emitting diode, a flexible display, a 3D display and/or the like.

Depending on how the mobile communication terminal 100 is realized, there can be more than one display module. For example, the mobile communication terminal 100 can have a plurality of display modules arranged together or separately on one surface thereof or on different surfaces, respectively.

The acoustic output module can output audio data received from the mobile communication unit 110 or stored in the memory 130, in a call signal mode, a telephone call or a recording mode, a voice recognition mode, a broadcasting reception mode and the like.

Moreover, the acoustic output module can output an audio signal related to a function (e.g., a call signal receiving alert, a message arriving alert, etc.) performed by the mobile communication terminal 100. Such an acoustic output module can include a receiver, a speaker, a buzzer, and the like.

The haptic module generates various haptic effects that a user can sense. Vibration is a typical example of the haptic effect generated by the haptic module. The intensity and pattern of the vibration generated by the haptic module are controllable. For example, it is possible to output the vibration by combining different vibrations or output the different vibrations successively.

The input unit 140 is a user interface for having various commands input by the user and has no particular restriction on how it is realized. For example, the input unit 140 can be provided as one or more operation units of a key pad, a touch pad, a wheel key, a jog switch, and the like.

As the mobile communication terminal 100 increasingly adopts a full touch type that utilizes a touch screen method, the input unit 140 can be realized in a soft-key method throughout an entire surface of a display screen by being combined with the display module of the output unit 135.

The camera 145 processes image frames, such as still images or video, which are obtained by an image sensor in the video call mode or the camera mode. The processed image frames can be displayed in the output unit 135.

The image frames processed by the camera 145 can be stored in the memory 130 or transmitted to an outside using one of the mobile communication unit 110, the wireless internet unit 115, and the short-range communication unit 125. Moreover, there can be more than one camera 145, depending on the configuration of the mobile communication terminal 100.

Moreover, the camera 145 can photograph identification marks, such as graduations, a lamp and the like, which are indicated on the tag 200, and the photographed image frames can be used by the controller 165 as a basis for computing the approaching angle.

Figure 5:
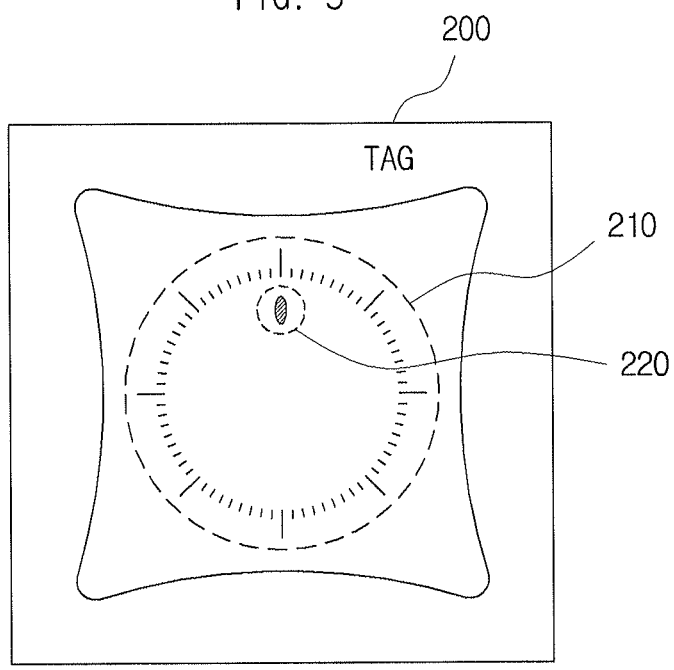
FIG. 5 is a view illustrating a tag according to an exemplary embodiment.

For example, FIG. 5 is a view illustrating a tag according to an exemplary embodiment. As illustrated in FIG. 5, a front face of the tag 200 can have identification graduations 210 marked thereon to indicate a direction, and also can have an identification lamp 220, such as a diode, installed therein to indicate a particular direction. In case that the mobile communication terminal 100 approaches the tag 200 and sets a communication link, the controller 165 can analyze the image frame photographed by the camera 145 to compute a tilt angle of the mobile communication 100 at the time of photographing and generate the approaching angle.

The sensor 150 detects a current status of the mobile communication terminal 100, for example, an open/close state of the mobile communication terminal 100, a location of the mobile communication terminal 100, a contact status (touch input) of the user, an orientation of the mobile communication terminal 100, an acceleration/deceleration of the mobile communication terminal 100 and the like, to generate a sensing signal for controlling an operation of the mobile communication terminal 100. For example, in the case that the mobile communication terminal 100 is a slide, a swivel, or a flip phone, the sensor 150 can sense whether the phone is open or closed. Moreover, the sensor 150 can perform various sensing functions such as sensing power provided by the power supply source 160, coupling of the interface 170 with an external device, and the like.

The sensor 150 detects shaking of the mobile communication terminal 100 and notifies the detection of shaking to the controller 165. Moreover, the sensor 150 can measure the tilted angle of the mobile communication terminal 100 and provide the measured data to the controller 165. For example, if the mobile communication terminal is provided with a gyro sensor, the sensor 150 can measure the tilt angle or a level of tilting of the mobile communication terminal 100 using the gyro sensor. Moreover, the sensor 150 can measure the tilt angle using one or more of an acceleration sensor, a gravity sensor, a compass sensor and the like, instead of the gyro sensor. For example, the sensor 150 can use the acceleration sensor or the gravity sensor to measure the tilt angle with respect to the ground or use the compass sensor to measure an azimuth angle.

For example, if the tag 200 is attached to an object that is installed on a wall (i.e., a vertical state), the approaching angle of the mobile communication terminal 100 with respect to the tag 200 can be measured as a tilt angle between 0 and 360 degrees. If the tag 200 is attached to an object that is installed on a floor or a ground (i.e., a horizontal state), the approaching angle of the mobile communication terminal 100 with respect to the tag 200 can be measured as an azimuth angle between 0 and 360 degrees. Moreover, the approaching angle can be measured as a combination of the vertical state and the horizontal state by measuring the tilt angle and the azimuth angle.

The sensor 150 can measure the tilt angle of the mobile communication terminal 100 when the communication link is generated between the tag 200 and the mobile communication terminal 100 or when a code is recognized. Here, the sensor 150 can start measuring the tilt angle when instructed by the controller 165 i.e., at a time when the sensor 150 measures the tilt angle.

The code recognition unit 155 handles a function of recognizing a code, such as a QR code, a bar code and the like. For example, the code recognition unit 155 can recognize the code by analyzing a code image that is obtained through the camera 145.

The power source 160 is provided with external power and/or internal power under the control of the controller 165 and supplies power that is required for operation of each of the units of the mobile communication terminal 100.

The controller 165 generally controls overall operations of the mobile communication terminal 100. For example, the controller 165 handles controls and processes related to voice call, video call, data communication and the like. Moreover, the controller 165 can encompass a multimedia module for multimedia playback.

The controller 165 can perform one or more calculations using measurement data of the mobile communication terminal 100 that is provided by the sensor 150 and generate the approaching angle based on the calculation.

Moreover, the controller 165 can calculate the tilt angle of the mobile communication terminal 100 by analyzing an image frame provided by the camera 145 and analyzing the approaching angle based on this calculation.

Figure 3:
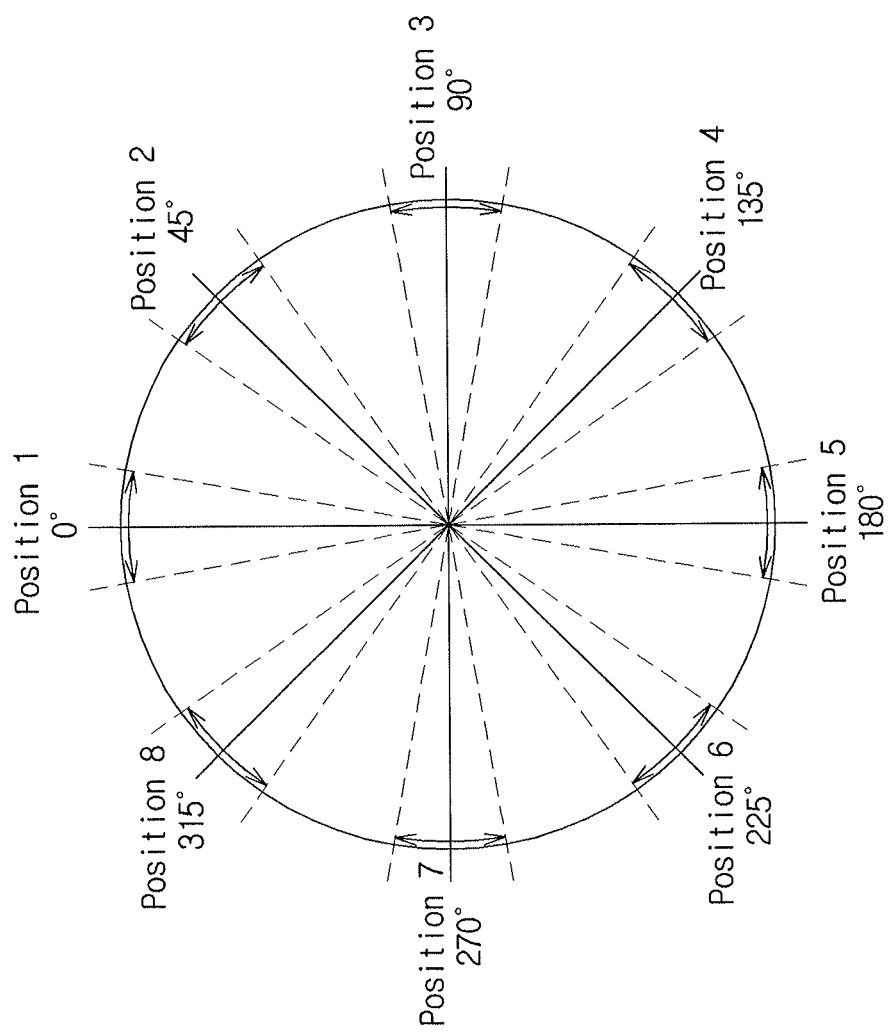
FIG. 3 is a view illustrating positions of a mobile communication terminal based on approaching angles according to an exemplary embodiment.

For example, FIG. 3 is a view illustrating positions of a mobile communication terminal based on approaching angle according to an exemplary embodiment. Referring to FIG. 3, the position of the mobile communication terminal 100 can be expressed in 8 different approaching angles, in which 360 degrees are divided into 8 sections. That is, the position is expressed as a section, in which 360 degrees are separated by 45 degrees, and each section can have a predetermined range.

Figure 4:
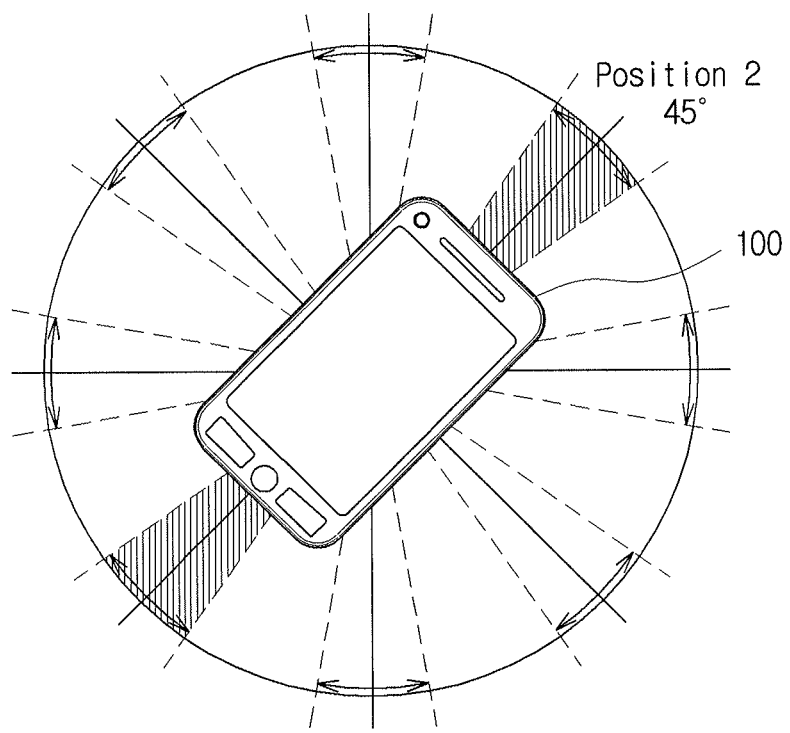
FIG. 4 is a view illustrating a position of a mobile communication terminal according to an exemplary embodiment.

For example, FIG. 4 is a view illustrating a position of the mobile communication terminal according to an exemplary embodiment. As illustrated in FIG. 4, the position of the mobile communication terminal 100 becomes "Position 2" if the approaching angle of the mobile communication terminal 100 is measured to be 45 degrees.

The controller 165 controls the sensor 150 in such a way that the tilted angle of the mobile communication terminal 100 is measured when the tag information is obtained from the tag 200 or the code information is recognized. The controller 165 can also control the mobile communication unit 110 or the wireless internet unit 115 in such a way that the tilt angle can be transmitted to the information providing server 300 together with the tag information or the code information, once the tilt angle is calculated.

Moreover, the controller 165 can control the mobile communication unit 110 or the wireless internet unit 115 in such a way that the mobile communication unit 110 or the wireless internet unit 115 can access a pertinent server by using connection information, once the connection information corresponding to the representative information and the tilt angle is received from the information providing server 300.

Moreover, the controller 165 can control the location information unit 120 in such a way that location information and time information can be obtained when the tag information is read from the tag 200 or the code information is recognized, and can control the mobile communication unit 110 or the wireless internet unit 115 in such a way that the representative information can be transmitted to the information providing server 300 together with the location information and/or the time information.

The interface 170 provides a path to all external devices that are connected with the mobile communication terminal 100. Data is transmitted from the external device and/or power is supplied to the interface 170 in such a way that the data and/or the power is transferred to each element inside the mobile communication terminal 100 or that data inside the mobile communication terminal 100 is transmitted to the external device. For example, included in the interface 170 can be a wired/wireless headset port, an external charger port, a wired/wireless data port, a memory card port, a port connecting a device having an identification module, an audio I/O (input/output) port, a video I/O port, an earphone port and the like.

Figure 6:
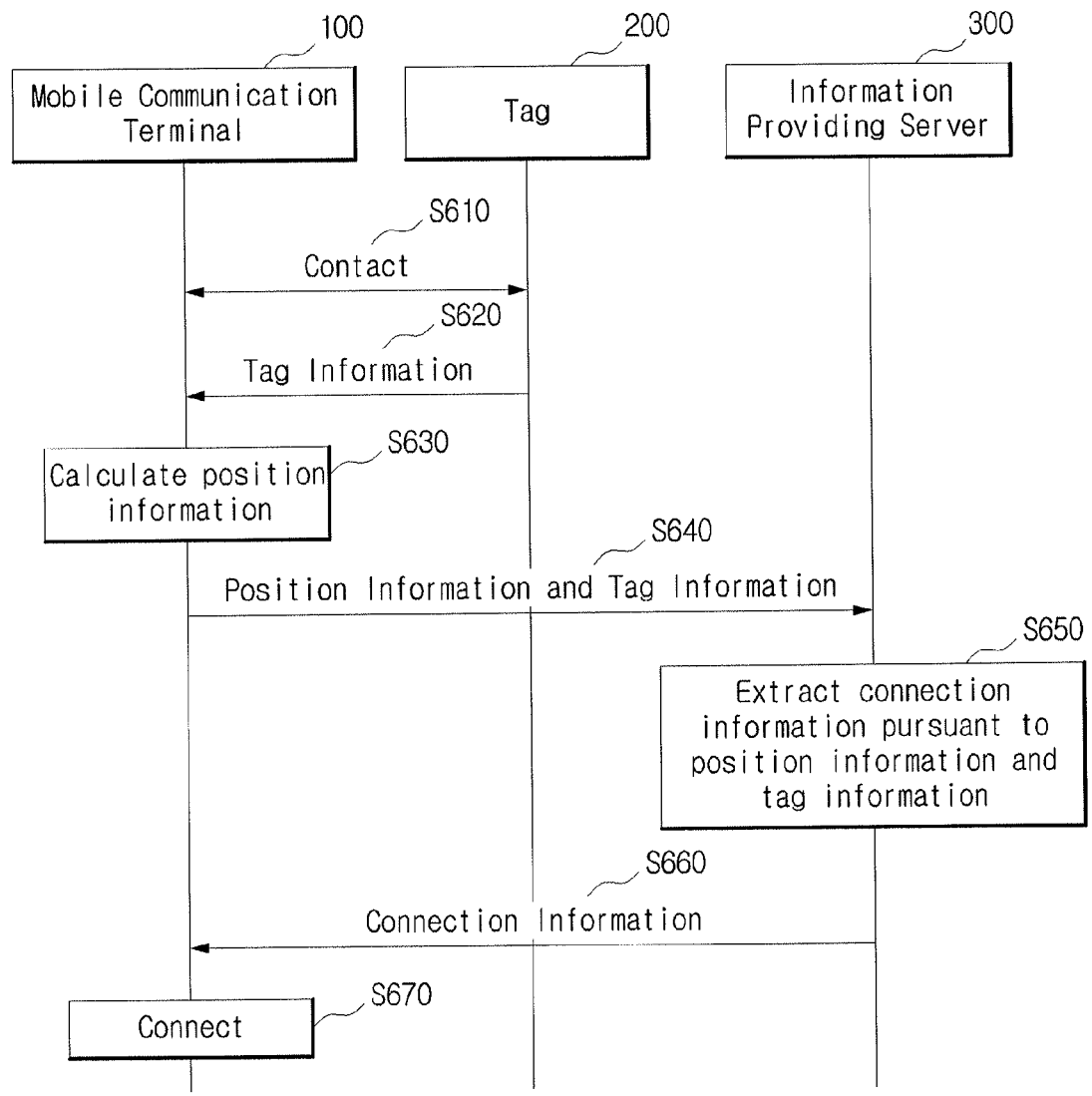
FIG. 6 is a flow diagram illustrating a method of providing information according to an exemplary embodiment.

FIG. 6 is a flow diagram illustrating a method of providing information according to an exemplary embodiment.

In operation S610, the mobile communication terminal 100 and the tag 200 contact each other or are provided within a predetermined distance in which the mobile terminal 100 can read the tag 200. Here, the user of the mobile communication terminal 100 can have the mobile communication terminal 100 touch the tag 200 in a predetermined tilt angle. This is only one example, and as described above, the mobile communication terminal 100 and the tag 200 can be positioned with a communicable distance ("d") so as to perform short-range communication.

In operation S620, the mobile communication terminal 100 obtains the tag information from the tag 200, using the short-range communication function. Here, the tag information includes the connection information and the representative information for information to be provided to the user from the information providing server 300.

In operation S630, the mobile communication terminal 100 calculates the position information of the communication terminal 100. Here, the position information can be the tilt angle of the mobile communication terminal 100. Exemplary method of calculating the tilt angle of an approaching mobile communication terminal has been described above with reference to FIGS. 1 to 5 and thus will be omitted.

In operation S640, the mobile communication terminal 100 transmits the position information and the tag information to the information providing server 300. That is, the mobile communication terminal 100 can sent the representative information and the tilt angle to the information providing server 300.

In operation S650, the information providing server 300 extracts the connection information pursuant to the position information and the tag information. The information providing server 300 can map and store the connection information for connecting to a server that provides a service corresponding to the tag information and the position information and can extract the connection information from this mapped information.

In operation S660, the information providing server 300 transmits the extracted connection information to the mobile communication terminal 100.

In S670, the mobile communication terminal 100 connects to a server or other device that provides a respective service using the received connection information.

The method for providing information in accordance with an exemplary embodiment can be embodied in the form of program instructions, which can be performed through various electronic data processing means, and can be written in a storage medium, which can include program instructions, data files, data structures and the combination thereof.

The program instructions stored in the storage medium can be designed and configured specifically for exemplary embodiments or can be publically known and available to those who are skilled in the field of software. Examples of the storage medium can include magnetic media, such as a hard disk, a floppy disk and a magnetic tape, optical media, such as CD-ROM and DVD, magneto-optical media, such as a floptical disk, and hardware devices, such as ROM, RAM and flash memory, which are specifically configured to store and run program instructions. Moreover, the above-described media can be transmission media, such as optical or metal lines and a waveguide, which include a carrier wave that transmits a signal designating program instructions, data structures, etc. Examples of the program instructions can include machine codes made by, for example, a compiler, as well as high-language codes that can be executed by an electronic data processing device, for example, a computer, by using an interpreter.

The above hardware devices can be configured to operate as one or more software modules in order to perform the operation of exemplary embodiments, and the opposite is also possible.

Although exemplary embodiments have been described above, it shall be appreciated that there can be a variety of changes and modifications apparent to those who are ordinarily skilled in the art without departing from the technical ideas and scope of an inventive concept, which shall be defined by the appended claims and their equivalents.

What is claimed is:

1. A system for providing information comprising:
a tag configured to store tag information comprising connection information and representative information about various services;
a mobile communication terminal configured to obtain the connection information using short-range communication and configured to calculate position information of the mobile communication terminal based on the obtained connection information; and
an information providing server configured to receive the representative information and the position information from the mobile communication terminal, to determine one of a plurality of services, each of which correspond to a different position information for the mobile communication terminal, wherein said one determined service is identified as a service corresponding to the received position information for the mobile communication terminal, to extract service address information which provides information for connecting to said determined one service, and to provide the extracted service address information to the mobile communication terminal,
wherein the mobile communication terminal connects to said determined one service based on the service address information, and
wherein each of said plurality of services corresponds to respectively alternate position information of the mobile communication terminal with respect to the tag.

2. The system for providing information in accordance with claim 1, wherein the position information is a tilt angle measured by a sensor as the mobile communication terminal approaches the tag.

3. The system for providing information in accordance with claim 1, wherein the representative information comprises at least one of information related to said determined one service and address information of the information providing server.

4. The system for providing information in accordance with claim 1, wherein the information providing server is configured to store the service address information based on predetermined position information.

5. The system for providing information in accordance with claim 1, wherein the information providing server is configured to store the service address information based on predetermined location information and to provide the service address information corresponding to a location of the mobile communication terminal when the tag information is obtained by the mobile communication terminal.

6. The system for providing information in accordance with claim 1, wherein the information providing server is configured to store the service address information based on predetermined time information and to provide the service address information corresponding based on a time when the tag information is obtained by the mobile communication terminal.

7. The system for providing information in accordance with claim 1, wherein the mobile communication terminal is configured to measure a tilt angle of the mobile communication terminal as the mobile communication terminal approaches the tag when the connection information is recognized.

8. A mobile communication terminal comprising:
a short-range communication unit configured to obtain tag information, comprising connection information and representative information about various services, from a tag;
a sensor configured to compute position information of the mobile communication terminal based on the connection information; and
a controller configured to obtain service address information, which provides information for connecting to a service identified by the tag information and based on the representative information and the position information, from a server to determine one of a plurality of services, each of which correspond to a different position information for the mobile communication terminal, wherein said one determined service is identified as a service corresponding to the received position information for the mobile communication terminal and to control the connecting to the determined one service,
wherein each of said plurality of services corresponds to respectively alternate position information of the mobile communication terminal with respect to the tag.

9. The mobile communication terminal in accordance with claim 8, wherein the position information is a tilt angle measured by the sensor as the mobile communication terminal approaches the tag.

10. The mobile communication terminal in accordance with claim 9, wherein the controller is configured to divide 360 degrees into a plurality of sections and determine a section in which the tilt angle is included.

11. The mobile communication terminal in accordance with claim 8, further comprising a camera configured to capture an identification mark on the tag when the mobile communication terminal approaches the tag,
wherein the controller determines the tilt angle of the mobile communication terminal based on the captured identification mark.

12. The mobile communication terminal in accordance with claim 8, further comprising:
a camera configured to capture a code; and
a code recognition unit configured to recognize the captured code,
wherein the controller is configured to control the sensor such that the position information which comprises a tilt angle of the mobile communication terminal is measured by the sensor when the code is recognized and to control the connecting to said determined one service based on the obtained service address information.

13. The mobile communication terminal in accordance with claim 8, wherein the controller is configured to obtain the service address information from the server based on a time or a location of the mobile communication terminal when the tag information is obtained and to control the connecting to said determined one service based on the obtained service address information.

14. A method for providing information by use of short-range communication, the method comprising:
obtaining, by a mobile communication terminal, tag information, comprising connection information and representative information about various services, from a tag using the short-range communication;
calculating, by the mobile communication terminal, position information of the mobile communication terminal based on the connection information;
transmitting, by the mobile communication terminal, the tag information and the position information to an information providing server;

extracting, by the information providing server, service address information which provides information for connecting to a service identified by the representative information and based on the position information to determine one of a plurality of services, each of which corresponds to a different position information for the mobile communication terminal, wherein said one determined service is identified as a service corresponding to the received position information for the mobile communication terminal and transmitting, by the information providing server, the extracted service address information to the mobile communication terminal; and connecting, by the mobile communication terminal, to the said determined one service, wherein each of said plurality of various service corresponds to respectively alternate position information of the mobile communication terminal with respect to the tag.

15. The method for providing information in accordance with claim 14, wherein the position information is a tilt angle measured by a sensor as the mobile communication terminal approaches the tag.

16. The method for providing information in accordance with claim 14, wherein the representative information comprises at least one of information related to said determined one service and address information of the information providing server.

17. The method for providing information in accordance with claim 14, further comprising, prior to the obtaining the tag information, storing, by the information providing server, the service address information based on predetermined position information.

18. The method for providing information in accordance with claim 14, further comprising, prior to the obtaining the tag information, storing, by the information providing server, said determined one service address information based on predetermined location information, wherein the transmitting the tag information and the position information, by the mobile communication terminal, to the information providing server comprises transmitting location information and the tag information, and wherein the extracting the service address information and the transmitting the extracted service address information to the mobile communication terminal comprises providing to the mobile communication terminal the service address information based on the location information.

19. The method for providing information in accordance with claim 14, further comprising, prior to the obtaining the tag information, storing, by the information providing server, service address information based on predetermined time information, wherein the transmitting the tag information and the position information to the information providing server comprises transmitting, by the mobile communication terminal, time information and the tag information to the information providing server, and wherein the extracting the service address information and the transmitting the extracted service address information to the mobile communication terminal comprises providing the service address information based on the time information to the mobile communication terminal.

20. A method for providing information comprising:
obtaining, by a mobile communication terminal, code information comprising connection information and representative information about various services;

calculating, by the mobile communication terminal, position information of the mobile communication terminal based on the obtained connection information; and transmitting, by the mobile communication terminal, the representative information and the position information to an information providing server;

determining one of a plurality of services, each of which corresponds to a different position information for the mobile communication terminal wherein said one determined service is identified as a service corresponding to the receiving position information for the mobile communication terminal, extracting, by the information providing terminal, service address information which provides information for connecting to said determined one service by the information providing terminal;

providing the extracted service address information to the mobile communication terminal; and connecting, by the mobile communication terminal, to the said determined one service based on the service address information, wherein each of said plurality of services corresponds to respectively alternate position information of the mobile communication terminal with respect to a tag.

21. The system for providing information according to claim 3, wherein at least one of different information related to the said determined one service and different service address information is provided based on the position information which comprises a tilt angle of the mobile communication terminal measures as the mobile communication terminal approaches the tag.

22. The system for providing information according to claim 1, wherein different services are provided based on the position information of the mobile communication terminal.

23. A method for providing information comprising:
detecting tag information, comprising connection information and representative information about various services, by a mobile communication terminal using short-range communication;

calculating position of the mobile communication terminal based on the obtained connection;

determining one of a plurality of services, each of which corresponds to a different position of the mobile communication terminal, wherein said one determined service is identified as a service corresponding to the calculated position of the mobile communication terminal; and providing information for connecting to said determined one service to the mobile communication terminal, wherein each of said plurality of services corresponds to respectively alternate position information of the mobile communication terminal with respect to a tag.

24. The method for providing information in accordance with claim 23, further comprising providing to the mobile communication terminal information related to the said determined one service based on the tag information and the position of the mobile communication terminal, wherein the related information varies based on the position of the mobile communication terminal.

25. The method for providing information in accordance with claim 23, wherein the provided service information varies based on the position of the mobile communication terminal and wherein the position of the mobile communication terminal comprises a tilt angle of the mobile communication terminal when detecting the tag information.

26. The method for providing information in accordance with claim 23, further comprising allocating different service information based on different positions, wherein the different positions of the mobile communication terminal comprises tilt angles of the mobile communication terminal when detecting the tag information.

27. The system for providing information in accordance with claim 1, wherein the representative information is a short text and a first one of the plurality of services includes information about a webpage for purchasing a movie ticket, a second one of the plurality of services includes information about a webpage for previewing a movie and a third one of the plurality of services includes information about a webpage for posting a message.

28. The system for providing information in accordance with claim 1, wherein the respectively alternate position information are tilt angles between the mobile communication terminal and the tag.

29. The system for providing information in accordance with claim 28, wherein the tilt angles are within a range of a circular, planar-projection of the tag upon the mobile communication terminal.

30. The system for providing information in accordance with claim 29, wherein the mobile communication terminal is further configured to determine the tilt angles at least by photographing the tag and comparing an identification lamp of the tag and identification graduations of the tag according to the circular, planar-projection.

* * * * *